Feb. 23, 1926. 1,573,910
O. F. BRINKMAN
ATTACHMENT FOR MOTOR VEHICLES
Filed Dec. 11, 1924 2 Sheets-Sheet 1
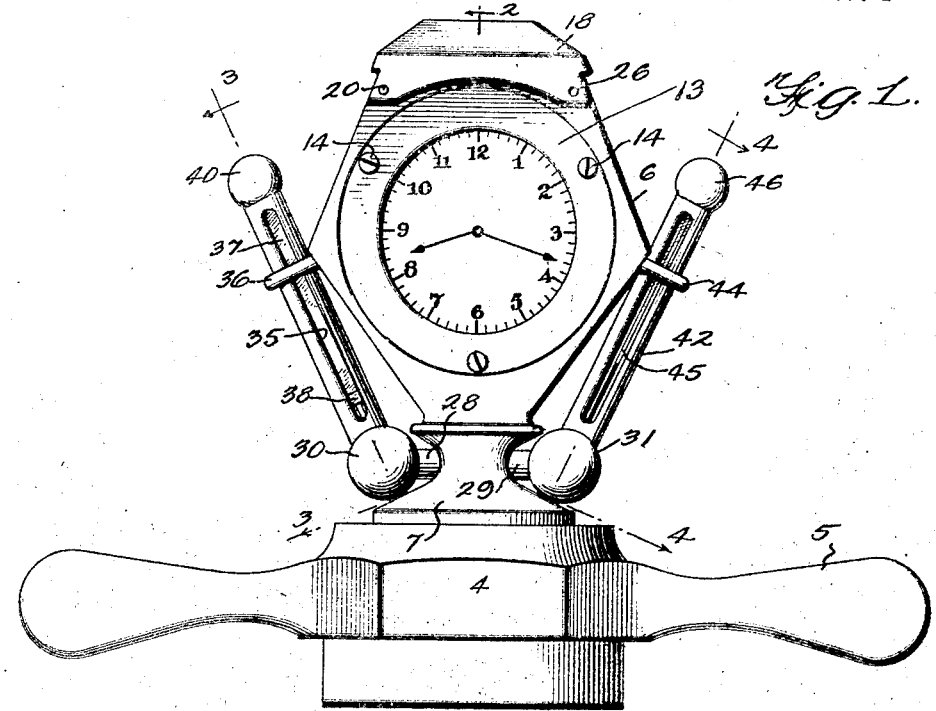
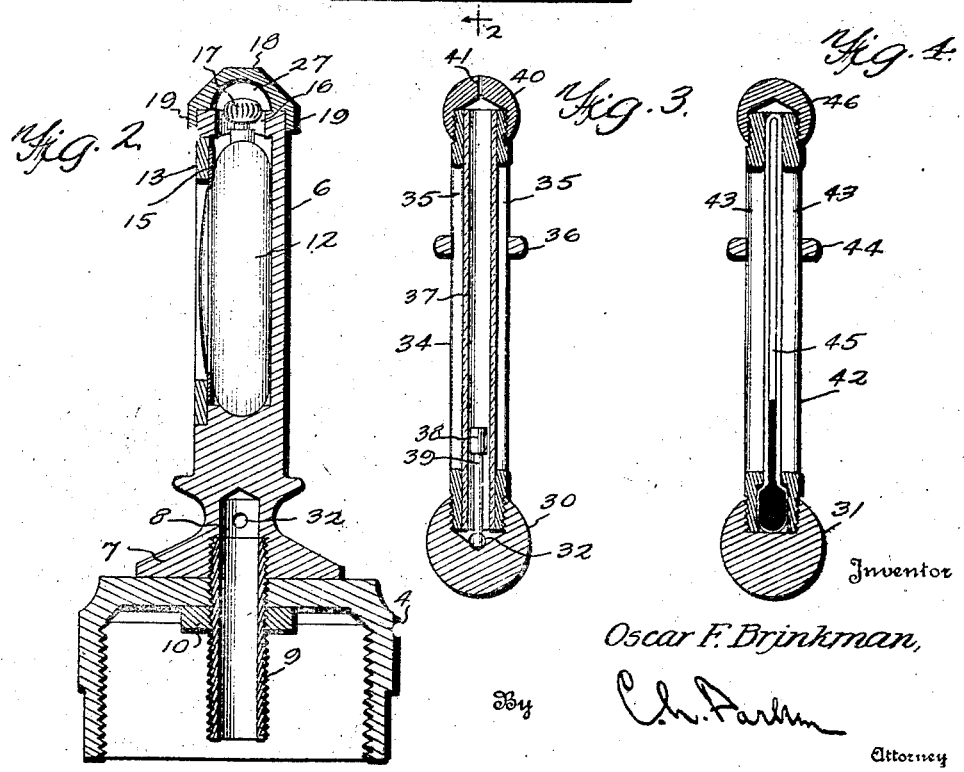
Inventor
Oscar F. Brinkman,
By
Attorney Feb. 23, 1926.
1,573,910
O. F. BRINKMAN
ATTACHMENT FOR MOTOR VEHICLES
Filed Dec. 11, 1924     2 Sheets-Sheet 2
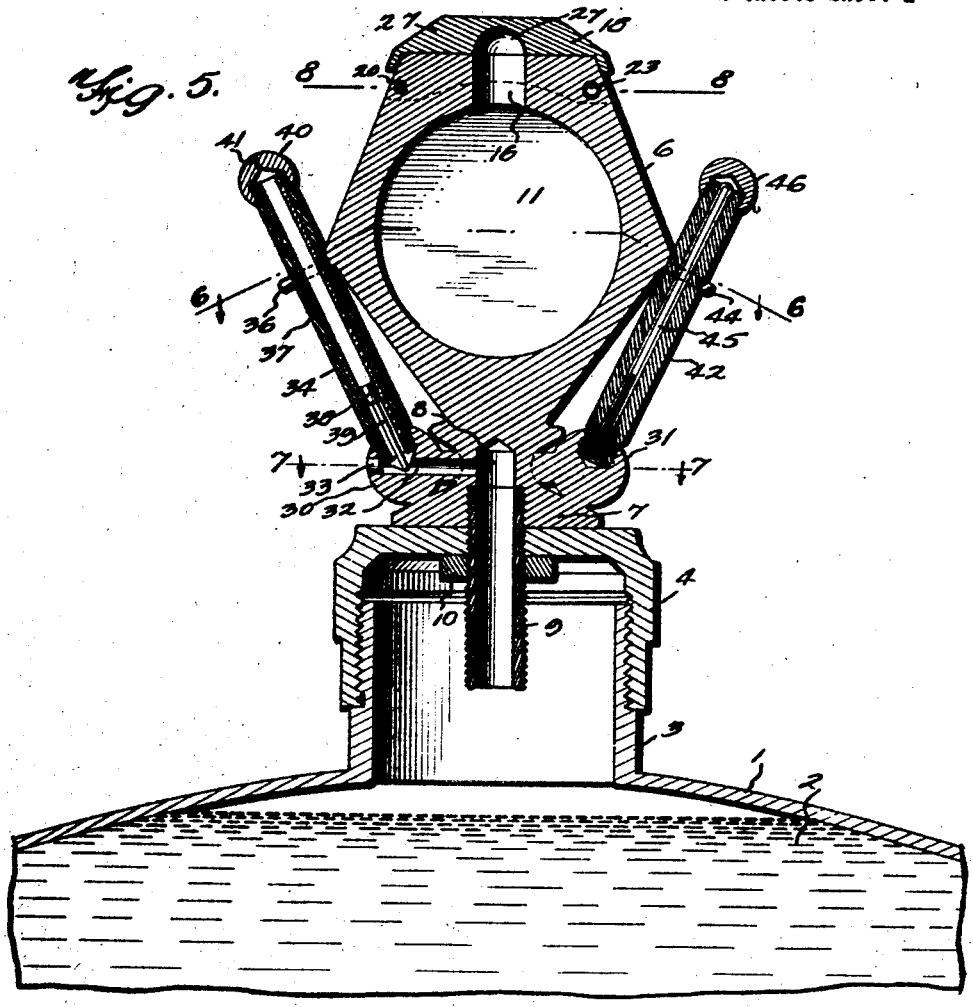
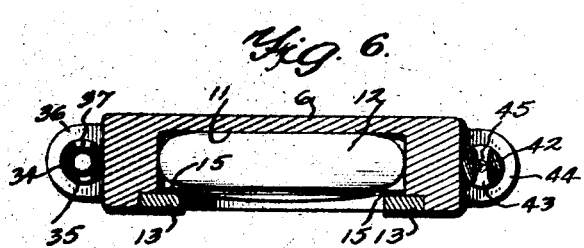
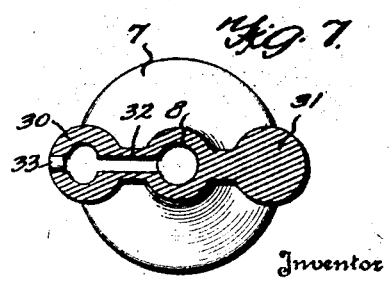
Inventor
Oscar F. Brinkman,
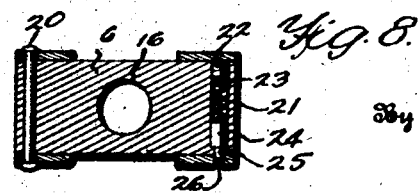
By
Attorney Patented Feb. 23, 1926.

1,573,910

UNITED STATES PATENT OFFICE.

OSCAR F. BRINKMAN, OF LANCASTER, PENNSYLVANIA, ASSIGNOR OF ONE-HALF TO MORRIS KLIVANSKY, OF LANCASTER, PENNSYLVANIA.

ATTACHMENT FOR MOTOR VEHICLES.

Application filed December 11, 1924. Serial No. 755,348.

*To all whom it may concern:*

Be it known that I, OSCAR F. BRINKMAN, a citizen of the United States, residing at Lancaster, in the county of Lancaster and State of Pennsylvania, have invented certain new and useful Improvements in Attachments for Motor Vehicles, of which the following is a specification.

This invention relates to attachments for motor vehicles, and more particularly to a device adapted to be carried by the radiator cap which will serve as a support for a watch or clock, and other indicating devices.

An object of the invention is to provide a watch or clock support adapted to be mounted on a radiator that is ornamental and will add to the appearance of an automobile and, at the same time, will so position the watch or clock that it is always in sight of the driver, thus permitting him to see the time without diverting his attention from the driving of the vehicle.

A further object is to provide a watch or clock case having rings or supporting members on each side to receive tubes in which a thermometer and a pressure indicating device may be supported.

A further object is to provide a support or case for a watch or clock which will protect it from the elements and permit access to the stem for winding.

In the accompanying drawings, I have shown one embodiment of the invention. In this showing:

Figure 1 is a front elevation,

Figure 2 is a vertical sectional view on line 2—2 of Figure 1,

Figure 3 is a vertical sectional view on line 3—3 of Figure 1,

Figure 4 is a similar view on line 4—4 of Figure 1,

Figure 5 is a vertical sectional view showing the device in position on the radiator of a motor vehicle and taken in a plane transversely of the vehicle, Figure 6 is a horizontal sectional view on line 6—6 of Figure 5, Figure 7 is a similar view on line 7—7 of Figure 5, and, Figure 8 is a similar view on line 8—8 of Figure 5.

Referring to the drawings, the reference numeral 1 designates a portion of the radiator of a motor vehicle. The radiator is connected to the cooling system (not shown) in the usual manner, and is adapted to contain a cooling fluid 2, generally water. The radiator is provided with a filling opening 3, which is screw-threaded to receive a cap in the usual manner. The parts heretofore described are of the usual construction and form no part of the present invention, except in the combination claimed.

The device forming the subject matter of the present invention is adapted to be carried by the radiator cap and may be formed integral therewith, or secured thereto in any suitable manner. As shown, I provide a radiator cap 4 having internal threads to engage the threads on the filling opening and this cap may be provided with the usual cross arms 5 if desired. The watch or clock is supported in a case 6 which may be of any desired shape and which is provided with a base 7. The base is provided with a central vertical passage 8, the lower portion of which is internally threaded and is adapted to receive an externally threaded tube 9 which extends through a central opening in the radiator cap. A nut 10 is arranged on the tube and is adapted to engage the under side of the cap to hold the case in position. As shown, the case is provided with a central recess 11 which is of the proper size and shape to receive a watch 12. The front of the case is open (see Figures 2 and 6) to permit the watch to be inserted and is adapted to be closed by a ring 13 which is secured to the case by means of suitable fastening elements 14. A washer 15 may be arranged between the ring and the watch. The case is further provided with a passage 16 at the top adapted to receive the stem 17 of the watch, and this passage opens through the top of the case, as shown in Figures 2 and 5 of the drawings, to permit access to the stem for winding or setting the watch without removing it from the case. A cover 18 is mounted over the top of the case to permit closing of the passage 17 and preventing water, dust or the like from entering the interior of the case. As shown, the cover is provided with side flanges 19 and a pin 20 passes through these flanges adjacent one side to pivotally support it. The other side of the case is provided with a bore 21 having a plug 22 arranged in one end. A spring 23 is arranged in the bore and is adapted to project a locking member 24.

This locking member is provided with a reduced end 25, adapted to enter an opening 26 in the cover to retain it in closed position. As shown, the under side of the cover is provided with a recess 27 to receive the upper end of the stem.

The base portion 7 is provided with a pair of laterally extending arms 28 and 29, having spherical members 30 and 31 formed on their outer ends. The arm 28 and the spherical member 30 are provided with a lateral passage 32 which communicates with the vertical passage 8 in the base. The outer end of this passage is closed by a plug 33. The spherical member is provided with a threaded opening adapted to receive a tube 34, which is arranged at an angle, as shown, and which is provided with openings 35 in its front and rear faces (see Figures 1 and 3). The case is provided with a lateral extension 36, having an opening therein through which the tube passes and which supports the tube in the desired position. A glass tube 37 is arranged within the metal tube 34, and this glass tube is adapted to receive an indicating member 38 in the form of a piston of slightly smaller diameter than the interior diameter of the glass tube and provided with a rod or stem 39 extending downwardly therefrom. The glass tube is open at its upper end and the metal tube 34 is externally threaded and is adapted to engage internal threads formed in an opening in a ball shaped member 40. As shown, this ball shaped member is provided with a small port or passage 41.

On the opposite side of the watch case, the spherical member 31 is provided with a threaded opening adapted to receive a tube 42. This tube is also formed of metal and is provided with openings 43 in its front and rear faces. The tube passes through an opening in a lateral member 44, formed on the case. A thermometer 45 is adapted to be arranged within the tube. The upper end of the tube is externally threaded and these threads are adapted to engage internal threads formed in an opening in a ball-shaped member 46, somewhat similar to the ball-shaped member 40 but not provided with a passage similar to the passage 41.

The operation of the device will be apparent from the foregoing description. The cap 4 is of standard construction having a central opening for the attachment of various devices carried on the radiator cap of motor vehicles and the base of the supporting member is secured to the cap by placing the tube 9 in the threaded portion of the vertical passage 8 and passing it through the opening in the cap. The nut 10 is then tightened against the under face of the cap to properly support the device. In assembling the device, the tubes 34 and 42 are passed through the openings in the lateral supporting members 36 and 44 and then screwed into the threaded openings in the spherical members 30 and 31. When the attachment is in position on an automobile, the watch faces the driver, permitting him to see the time when desired without taking his hand from the steering wheel to remove his watch from his pocket or without necessitating him glancing at the instrument board to see the clock arranged thereon. The time may be ascertained by the driver when looking straight ahead in driving. The watch, when mounted in the casing, is protected from the elements and need not be removed as long as it functions properly. The hands may be set or the watch wound by raising the cover 18. The catch 25 exerts sufficient pressure to retain the cover in closed position under normal conditions but at the same time, permits it to be opened manually.

The passages 8 and 32 are for the purpose of permitting steam to pass into the glass tube 37 if the water in the cooling system should become sufficiently heated to cause boiling or rapid evaporation. This steam or vapor passing upwardly through the tube raises the piston 38, giving an indication of overheating in the engine and upon further raise in temperature, steam passes outwardly through the opening 41.

The thermometer 45 will indicate the temperature in the parts of the device, which temperature will be influenced by the temperature existing in the cooling system. The radiator cap and the case are formed of a metal of high heat conductivity whereby a rise in temperature in the cooling system will be conducted through the metal to the spherical member 31 and be indicated on the thermometer. The provision of the opening 41 at the upper end of the tube 34 permits escape of steam and thus limits the increase in pressure and temperature within the necessary limit to prevent breaking the thermometer 45.

In constructing the device, the base 7 and the case 6 may be cast with the lateral members 36 and 44 formed on the sides of the case and the tubes 34 and 42 inserted after the base has been finished.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. An attachment for motor vehicles comprising a member having a depending tubular extension adapted to be secured to the filling opening of a radiator, of a motor vehicle, said member being provided with a recess extending inwardly from one face, and being further provided with a passage extending from the top of said recess through the top of said member whereby a watch may be arranged in said recess with the stem projecting through said passage, and means for retaining the watch in said recess.

2. In a device of the character described, a base, a watch case arranged over said base, a supporting member arranged on the side of said case, and a tube secured to said base and engaging said supporting member.

3. A device constructed in accordance with claim 2 wherein the outer end of said tube is provided with an outlet opening.

4. In a device of the character described, a base adapted to be secured to a radiator cap, said base being provided with a passage communicating with the interior of the radiator, a watch case arranged over said base, laterally extending arms mounted on said base, enlargements on the ends of said arms, tubes mounted in said enlargements, supporting members formed on the sides of said case and receiving said tubes, and caps arranged on said tubes.

5. A device constructed in accordance with claim 4 wherein the cap on one of said tubes is provided with an outlet opening.

In testimony whereof I affix my signature.

OSCAR F. BRINKMAN.